United States Patent
Bjorn et al.

[15] 3,701,072

[45] Oct. 24, 1972

[54] MERCURY LOADED BRASS BALL BEARING

[72] Inventors: James M. Bjorn, 69 18th Avenue; Frederick Marx, Jr., 1510 North D Street, both of Lake Worth, Fla. 33460

[22] Filed: Feb. 22, 1971

[21] Appl. No.: 117,465

[52] U.S. Cl..............................339/5 L, 339/118 RY
[51] Int. Cl. ...........................................H01r 39/46
[58] Field of Search...................339/278 C, 5, 8, 118

[56] References Cited

UNITED STATES PATENTS

| | | |
|---|---|---|
| 3,514,553 | 5/1970 | Penney, Jr. et al.....339/5 L X |
| 2,698,405 | 12/1954 | True et al...............339/8 L X |
| 1,955,652 | 4/1934 | Pearson...................339/8 PB |
| 3,021,496 | 2/1962 | Kenyon......................339/5 L |
| 2,181,145 | 11/1939 | Mose........................339/8 PB |
| 2,889,531 | 6/1959 | Ellerman et al............339/5 L |

*Primary Examiner*—Richard E. Moore
*Attorney*—Alexander & Dowell

[57] ABSTRACT

The ball bearing has inner and outer ball races of brass and a series of balls made of brass running in annular grooves in the mating faces of the races. The entire space within the recesses around the balls contain mercury. Bearing seals are disposed between the races adjacent their outer sides. The spaces between the seals and the sides of the mercury are filled with oil. The races are adapted to be connected in an electric circuit to permit the transmission of low voltage signals without frictional audio interference during rotation of the races.

2 Claims, 3 Drawing Figures

PATENTED OCT 24 1972 3,701,072

INVENTORS
James M. Bjorn
Frederick Marx, Jr
BY Alexander Dowell
ATTORNEYS

MERCURY LOADED BRASS BALL BEARING

DESCRIPTION OF INVENTION

Our invention is a mercury loaded brass ball bearing, the purpose of which is to permit the transmission of electrical current, especially of very low power levels, through a revolving electrical connection without the connection, i.e., bearing, generating any electrical noise due to moving contacts.

We have found that anti friction brass ball bearings, having brass balls and brass races, of the radial type with the metal element mercury surrounding while molecularly adhering to the balls and the ball races, will act as a perfect electrical conductor in a rotatable connection. This is possible because the mercury, being an excellent conductor, is always in contact with all the balls simultaneously, as well as with the races. The mercury acts as a conductive bridge between the balls and the races. It can be said that the inner race is in series with the outer race by virtue of the balls in the surrounding mercury being a continuous conductor and is in positive electrical contact with the races constantly to prevent corrosive action of air in contact with the mercury-brass amalgamation, i.e., "marriage." An oil seal is maintained around the mercury by incorporating in the bearing a seal or shield which retains both the mercury and the oil seal within the ball bearing.

The principal object of our invention is to provide a ball bearing using the above principal of electrical transmission, namely that of passing electric currents through a bearing whose balls are freely running in the element mercury which is retained within the confines of the bearing races through the use of said seals or shields. The oil seal is necessary in order to prevent corrosion of the mercury and brass upon coming into contact with one another while being exposed to air. No reaction occurs however if air is excluded from the combination.

We will explain the invention with reference to the accompanying drawing, which illustrates one practical embodiment thereof, to enable others familiar with the art to adopt and use the same; and will summarize in the claims the novel features of construction, and novel combinations of parts, for which protection is desired.

Figure 3:
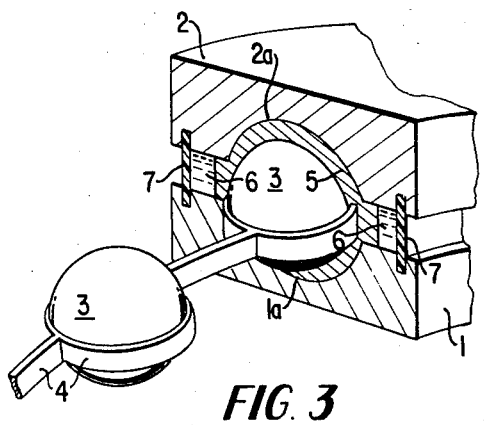
FIG. 3 is a detail section showing the ball bearings maintained in spaced relation by means of a ball spacer cage.

As shown, our novel mercury loaded brass ball bearing comprises an inner ball race 1 formed of brass, and an outer ball race 2 also formed of brass, the races 1 and 2 having complementary annular grooves 1a, 2a in their mating faces receiving a plurality of balls 3 also made of brass. The balls 3 are maintained in spaced relation within the recesses 1a and 2a by means of a ball spacer cage 4 as shown in FIG. 3, said ball spacer cage 4 being also preferably formed of brass.

The entire space within the recesses 1a, 2a of the ball races 1 and 2 around the balls 3, and extending outwardly towards the sides of the races is filled with the metal element mercury 5, as clearly shown somewhat exaggeratedly in the drawings. The space between the races 1 and 2 from the sides of the mercury 5 is filled with oil 6, as shown, thereby confining the mercury to the above space between the recesses 1a and 2a around the balls 3. The oil 5 is retained within the outer spaces between the ball races 1 and 2 by means of bearing seals 7 extending into recesses 1b, 2b in the mating faces of the ball races 1 and 2, the ends of the bearing seal 7 being embedded in frictionless bearing material 8 in the recesses 1b, 2b (FIG. 2) such as "Teflon" so as to confine the oil 6 between the mercury 5 and the bearing seals 7 without possibility of leakage, while permitting relative rotation between the inner and outer races 1 and 2.

Figure 1:
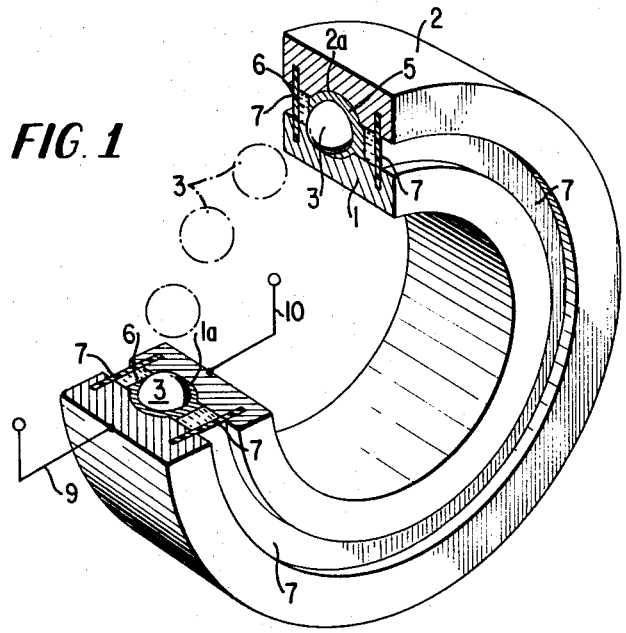
FIG. 1 is a perspective view, partly broken away, showing our mercury loaded brass ball bearing.
Figure 2:
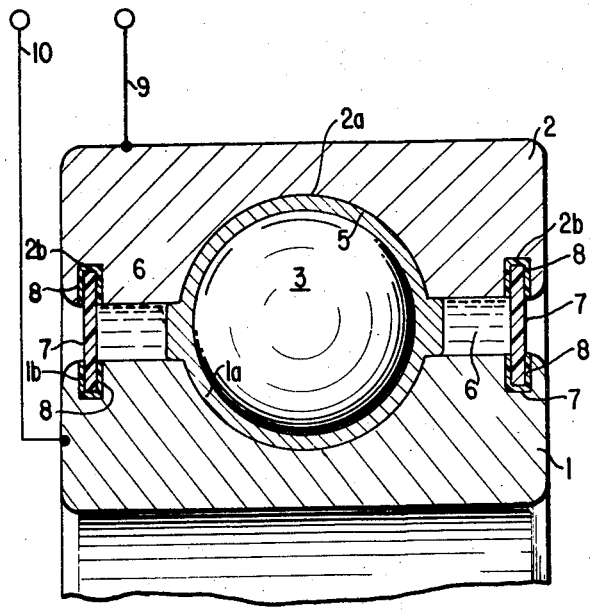
FIG. 2 is an enlarged transverse section through a portion of the bearing.

An electric conductor 9 may extend from the outer race 2, and a second electrical conductor 10 may extend from the inner race 1 as diagrammatically illustrated in FIGS. 1 and 2 for connection in an electric circuit.

By the above construction we have provided a mercury loaded brass ball bearing incorporating the following features:

1. Loading a ball type bearing with mercury to permit the transmission of low voltage signals without any frictional audio interference, through a rotatable connection, namely an anti-friction type bearing.

2. Retention of the mercury within the inner and outer races of said bearing around the balls through the employment of suitable oil seals and bearing seals, the purpose of the mercury within the races and around the balls of said ball bearing being to maintain the said balls in absolute and positive electrical contact with the inner and outer races of said ball type bearing simultaneously and constantly. This will be accomplished by the adherence or coating action of the mercury to the metal (brass) used in the construction of said ball bearing, and to the fact that mercury is an excellent electrical conductor.

We claim:

1. A mercury loaded brass ball bearing comprising a ball bearing having inner and outer ball races of brass, a series of balls made of brass running in annular grooves in the mating faces of the races; the entire space within the recesses around the balls containing mercury; and bearing seals between the races adjacent the outer sides thereof; said races having leads adapted to be connected in an electric circuit and to permit the transmission of low voltage signals without frictional audio interference during rotation of the races; said bearing seals having their ends extending into other annular recesses in the mating faces of the races; and "Teflon" bearing material in said other recesses into which the edges of the bearing seals are embedded, thereby permitting relative rotation between the said races.

2. A mercury loaded brass ball bearing comprising a ball bearing having inner and outer ball races of brass, a series of balls made of brass running in annular grooves in the mating faces of the races; the entire space within the recesses around the balls containing mercury; bearing seals between the races adjacent the outer sides thereof; the spaces between the seals and the sides of the mercury being filled with oil; said races having leads adapted to be connected in an electric circuit and to permit the transmission of low voltage signals without frictional audio interference during rotation of the races; said bearing seals having their ends extending into other annular recesses in the mating faces of the races; and "Teflon" bearing material in said other recesses into which the edges of the bearing seals are embedded, thereby permitting relative rotation between the said races.

* * * * *